UNITED STATES PATENT OFFICE.

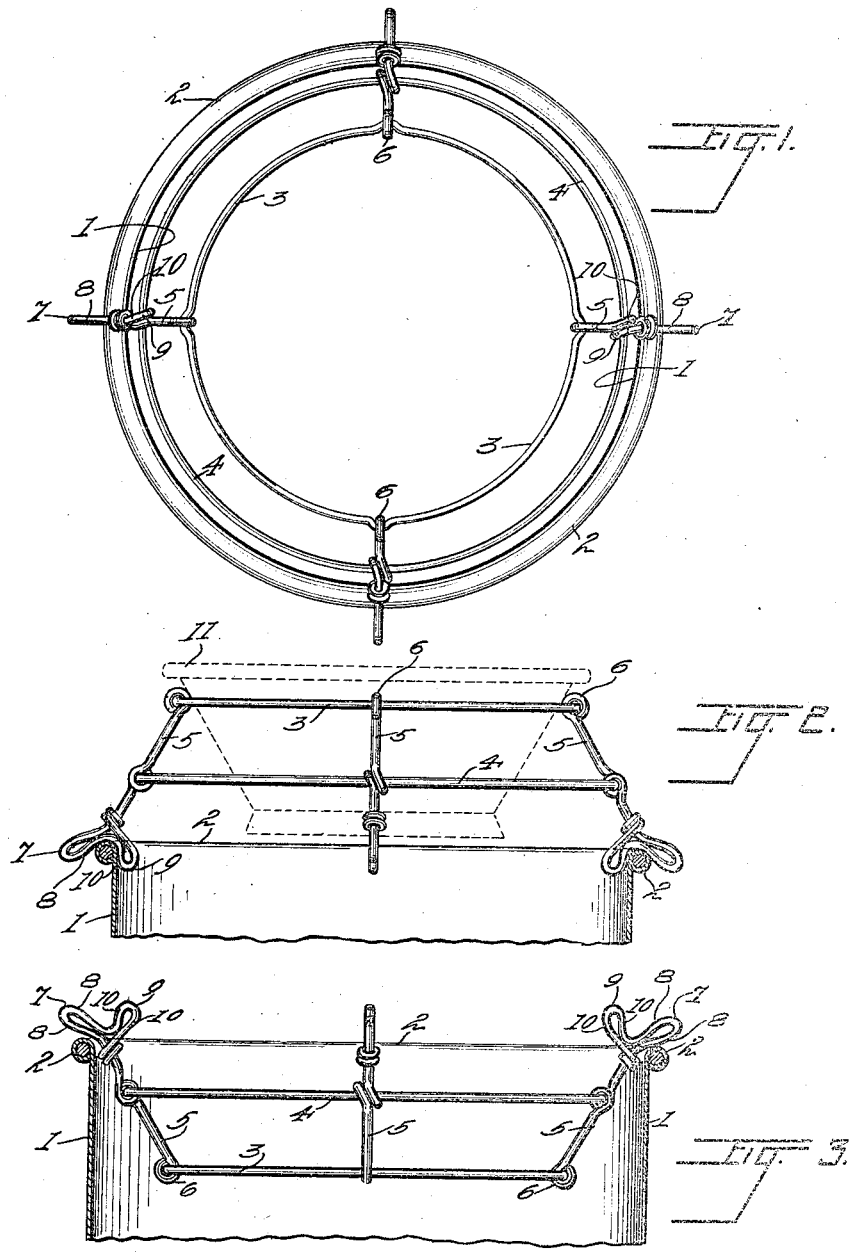

JOHN TROND SVAREN, OF FAYETTE, NORTH DAKOTA.

MILK-STRAINER SUPPORT.

1,241,573.  Specification of Letters Patent.  Patented Oct. 2, 1917.

Application filed March 23, 1916. Serial No. 86,246.

*To all whom it may concern:*

Be it known that I, JOHN T. SVAREN, a citizen of United States, residing at Fayette, in the county of Billings and State of North Dakota, have invented certain new and useful Improvements in Milk-Strainer Supports, of which the following is a specification.

This invention relates to improvements in milk strainer supports and one object of the same is to provide a support for the strainer adapted to rest upon the separator supply tank, thereby obviating the necessity of a person holding the strainer thereover.

Another object is the production of a strainer support that is reversible in order that the strainer may be supported above the plane of the mouth of the separator supply tank or below the same. When the separator supply tank is not to be filled to capacity it affords certain protection to the strainer and removes danger of its accidental displacement from operative position to have it disposed in or below the plane of the mouth of the separator supply tank; when the tank is to be filled to capacity it is advantageous to have the strainer supported above the mouth of the supply tank. The change in the position of the strainer with relation to the mouth of the tank is accomplished by reversing the strainer support.

With the foregoing and other objects in view the invention consists in the combination and arrangement of parts to be hereinafter fully described in the following specification, pointed out in the claims and illustrated in the accompanying drawing which forms a part of said specification and in which—

Figure 1 is a top plan view of my improved milk strainer support.

Fig. 2 is a side elevation of the same in position upon the mouth of the separator supply tank showing the strainer in position.

Fig. 3 is a similar view with the support in reversed position.

Like reference characters indicate corresponding parts throughout the several views.

The reference numeral 1 denotes the separator supply tank having the bead or mouth 2. My strainer support comprises a pair of spaced annular members 3, 4 which are disposed in parallel planes and supported in operative relation by means of the integral legs 5. One termination of each leg 5 comprises the hook or loop 6 which engages with the annular member 3 and extends up and about the annular member 4 and then upwardly to a point 7 when it is folded back upon itself to form the finger 8 and then upwardly and inwardly to the point 9 and back again and about the main leg portion thus forming another finger 10 disposed at right angles to the finger 8. Preferably four legs are provided to support the annular members 3, 4 and said legs are spaced about said members approximately 90 degrees apart. The strainer 11 is supported by the annular members 3 and 4.

In Fig. 2 the support is placed upon the separator supply tank with the fingers 8, 10 astraddle the bead of said tank and the annular member 3 uppermost. In this position of the support the strainer is supported above the supply tank. In Fig. 3 the support is reversed and the fingers 8 rest upon the bead 2 of the supply tank and the annular members 3, 4 are disposed within the mouth of the tank, the member 4 being uppermost and the strainer 11 when in position is supported within the mouth of said tank.

What is claimed is:—

1. A reversible strainer support for cream separator tanks comprising spaced annular members, legs connecting said members and projected therebeyond, pairs of fingers formed integral with the said leg projections, said fingers being adapted for joint engagement with the bead of the separator tank in one position of the strainer support and only one finger of each pair being adapted for engagement with the bead of the separator tank in the reversed position of the strainer support.

2. A reversible strainer support for cream separator tanks comprising spaced annular members of different diameters, the smaller of said members receiving the strainer direct, inclined legs connecting said members and projected beyond the larger member, pairs of fingers formed integral with the said leg projections, both fingers of each pair being adapted for engagement with the bead of the separator tank in one position of the strainer support and only one finger of each pair being adapted for engagement with the bead of the separator tank in the reversed position of the strainer support.

3. A reversible strainer support for cream separator tanks comprising spaced annular members of different diameters, the smaller of said members receiving the strainer direct, inclined legs connecting said members and projected beyond the larger member, pairs of fingers formed integral with the said leg projections, both fingers of each pair being adapted for engagement with the bead of the separator tank in one position of the strainer support with the smaller annular member positioned above the said tank bead and only one finger of each pair being adapted for engagement with the bead of the separator tank in the reversed position of the strainer support with the smaller annular member positioned below the said tank bead.

In testimony that I claim the foregoing as my own I have hereto affixed my signature in the presence of two subscribing witnesses.

JOHN TROND SVAREN.

Witnesses:
J. O. MILSTEN,
H. J. WESTLUND.

Copies of this patent may be obtained for five cents each, by addressing the "Commissioner of Patents, Washington, D. C."